United States Patent
Jurány et al.

[15] 3,692,410
[45] Sept. 19, 1972

[54] APPARATUS FOR DETERMINING THE HEMOGLOBIN CONTENT AND HEMATOGRIT RATIO OF BLOOD SAMPLES

[72] Inventors: György Jurány; András Komán; Pál Zillich, all of Budapest, Hungary

[73] Assignee: Medicor Muvek, Budapest, Hungary

[22] Filed: Jan. 27, 1971

[21] Appl. No.: 110,067

[30] Foreign Application Priority Data

Feb. 2, 1970  Hungary..................ME-1183

[52] U.S. Cl.......................................356/40, 356/72
[51] Int. Cl.........................G01n 33/16, G01n 21/00
[58] Field of Search..............356/39, 40, 72, 73, 208

[56] References Cited

UNITED STATES PATENTS

| | | |
|---|---|---|
| 3,567,321 | 3/1971 | Hogg..........................356/72 |
| 2,324,304 | 7/1943 | Katzman....................356/208 |
| 2,580,500 | 1/1952 | Albert........................356/208 |
| 1,978,096 | 10/1934 | White...........................356/40 |
| 2,964,640 | 12/1960 | Wippler.................356/208 X |
| 3,319,514 | 5/1967 | McAllister, Jr............356/208 |
| 3,439,267 | 4/1969 | Coulter et al.............356/39 X |
| 3,549,994 | 12/1970 | Rothermel et al.......356/39 X |

*Primary Examiner*—Ronald L. Wibert
*Assistant Examiner*—V. P. McGraw
*Attorney*—Young & Thompson

[57] ABSTRACT

A measuring arrangement for determining the haemoglobin content and haematocrit ratio of blood samples as well as the derivative of these two values by means of optical prisms and electrodes which are connected with an electronic circuit. This arrangement and device renders possible the observation of the content to be determined or undiluted samples without using a vessel or measuring cell.

5 Claims, 3 Drawing Figures

GYÖRGY JURÁNY
ANDRÁS KOMÁN
PÁL ZILLICH
Inventors

By Young & Thompson
Attorneys

APPARATUS FOR DETERMINING THE HEMOGLOBIN CONTENT AND HEMATOGRIT RATIO OF BLOOD SAMPLES

The invention relates to a measuring arrangement for determining the hemoglobin content and hematocrit value of blood samples and of the derivative of these contents by means of optical glass prisms permitting the light transillumination of undiluted blood samples and of the electrodes provided on those faces of the prisms which are in contact with the blood sample.

The methods used today for determining the hemoglobin content of blood samples are quite often obsolete and lack precision. The results are often expressed in units which have no exact definition. This involves complications and difficulties, e.g., when the patient is transferred from one hospital to another, so that test results obtained in various institutions have to be compared for evaluation, a situation which is eventually harmful for the patient too. This explains the world-wide efforts striving at unification and standardization of methods for hemoglobin measuring.

One known method for hemoglobin determination is based on the characteristic light absorption capacity of blood pigment for light of a certain wave length. Hence, a colorimeter or photometer satisfying the requirements of hemoglobin determination may be used. These widely used physico-chemical apparatuses are too complicated to be used in daily laboratory routine, but at the same time the number of hemoglobin tests to be performed increases rapidly. A simplification of these tests can be achieved by means of single-purpose apparatuses, so-called hemoglobinometers Regarding their principle of operation, these are photometers in which the measuring wave length cannot be varied, and their scale does not show the extinction figures usual in photometers, but in order to eliminate conversion, the results can be read off directly in grams or in mval/l.

The blood sample is generally placed in the apparatus in diluted condition and charged in glass vessels or cells having parallel walls. The charging and cleaning of such vessels may entail numerous errors, even with well-trained personnel. The walls of the vessels are plane-parallel optical glass faces. Any fingerprint, scratch or a drop of liquid may impair the measurement results. It is therefore essential to dry the vessels carefully, after the diluted blood has been charged into them. It is a disadvantage of these prior art methods that the vessel must be placed into the instrument in the dark, furthermore care must be taken that the light should travel parallel through the glass walls of the vessel. Any careless movement of the attendant may produce spilling of the sample within the apparatus. Such spilled samples are very difficult to remove, and lead to an eventual contamination or even corrosion of the interior of the device. Glass vessels are moreover rather expensive, whereas plastic vessels are easily scratched and accordingly large amounts are needed.

It is an object of the invention to eliminate these deficiencies. This is achieved according to the invention by arranging the prisms with a clearance leaving a width of layer permitting the photometric determination of the hemoglobin content of an undiluted blood sample, said clearance also permitting to measure the electrical conductivity between the electrodes arranged on the prisms, said prisms being connected with an electronic circuit defining the derivatives of the blood sample from the spectral light transmissivity and electrical conductivity.

The measuring arrangement and device according to the invention renders possible the determination of the hemoglobin content from diluted or undiluted samples without using a vessel or measuring cell.

The invention is described more particularly below with reference to the attached drawing showing some illustrative embodiments of the measuring arrangement according to the invention. In the drawing FIG. 1 is a schematic diagram of an arrangement for determining the hemoglobin content of an undiluted blood sample.

Figure 1:
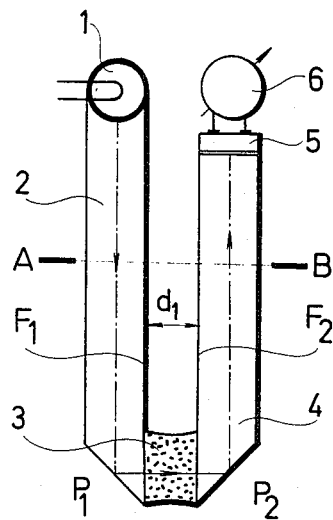

As can be seen in FIG. 1, a light pencil emitted by a light source 1 passes through prism 2 where it is deflected by 90°, then passes through a blood layer 3, travels through prism 4 where it is again deflected and after passing through a color filter 5 reaches a photoelectric sensor 6. The faces $F_1$, $F_2$ of the prisms 2 and 4 are arranged with a clearance $d_1$. If the clearance $d_1$ is selected appropriately, then the undiluted blood sample charged between the faces will be kept between said prism faces by adhesion force, that is, by capillary action, its shape being defined, in addition to the surface tension, by the faces $F_1$, $F_2$ of the prisms. If the planar faces $F_1$, $F_2$ of the prism are parallel to each other, then the blood drop between them will form a parallel-sided layer normal to the direction of passage of light. Thus the blood drop will have an optically well-defined thickness and will be adapted to be measured photometrically in a known manner.

It is known that the electrical conductivity of undiluted blood is determined by the blood plasma and by the blood corpuscles suspended in it. Since, however, the electrical conductivity of the blood corpuscles differs considerably from the conductivity of blood plasma, the measurement of the conductivity of blood permits conclusions to be drawn as to the volume of the blood corpuscles present in the blood plasma. The proportion of the volume of blood corpuscles is called the hematocrit value. Accordingly, measurements of the electrical conductivity of a blood sample supply also the hematocrit value. By means of the measuring arrangement and device according to the invention, therefore, the hematocrit value can be determined simultaneously with the hemoglobin content.

Figure 2:
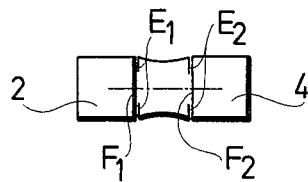
FIG. 2 is a section taken along the line A-B of FIG. 1.

The measuring arrangement required to this end is clearly visible in the diagram of FIG. 2. Electrode pairs $E_1$, $E_2$ are applied to the faces $F_1$, $F_2$ by vacuum evaporation. These electrode couples permit one to use a blood sample, which had just been used for hemoglobin determination, simultaneously for determination of the hematocrit value on the bases of electrical conductivity.

If the measuring arrangement is completed with one or more electrical and/or electronic circuits which will determine the derivative values of a blood sample from the spectral light transmissivity and electrical conductivity of the blood sample, the apparatus according to the invention is capable of simultaneous determination of the hemoglobin content, hematocrit value and of the derivative of the two values, measured on a single sample.

Figure 3:
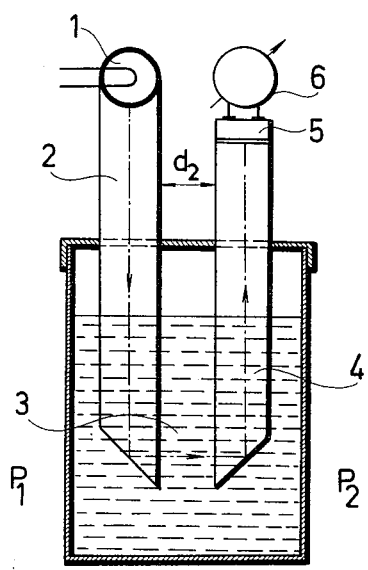
FIG. 3 is a schematic diagram of an arrangement for determining the hemoglobin content of a diluted blood sample.

A frequent requirement in medical laboratories is to determine the hemoglobin content of blood from a diluted blood sample. The measuring arrangement according to the invention as illustrated in FIG. 3 is suitable for such measurements too. In this case the clearance between the prisms $d_2$ must be larger, in conformity with the extent of dilution, so as to achieve a high absorption of appropriate degree. On account of the larger gap between the prisms, the sample will not adhere to the prism faces. In such cases the diluted sample can be charged in a normal measuring cup, and the prisms $P_1$, $P_2$ are simply dipped into the cup containing the blood sample. Upon dipping, as well as in the above described case, the width of layer of the photometrical measurement is determined by the relative distance of the prism faces.

In addition to fully satisfying the physical requirement of measurements with measuring cells (cuvettes), this solution affords extremely quick and simple operation of the apparatus, and at the same time excludes the risks of measuring errors which quite often occur in measurements with glass vessels. The method according to the invention permits one to store the blood sample in inexpensive, mass-produced cylindrical glass or plastic vessels or containers. The dimensions, external cleanness or worn condition of the measuring container does not influence the measuring results, since the wall of the container does not form part of the measuring operation. A further advantage of the apparatus or arrangement according to the invention is that the container with the sample need not be placed in the apparatus in a position precisely determined in relation to the path of light, since the position, dimension and shape of the container is entirely indifferent from the point of view of the measuring process. The container may be arranged outside the measuring apparatus and can therefore be kept clean easily. The expensive measuring vessels with parallel walls can be dispensed with, and the time of measurement is substantially reduced so that the apparatus is well suited for routine use in hospitals, clinics and other similar application.

The measuring arrangement illustrated in FIG. 3, furthermore permits one to measure blood losses. So far the precise determination of blood losses occurring in serious operations or upon important internal hemorrhages was only possible by weighing. Such precise determination of the blood losses is, however, of decisive importance from the point of view of replacement of blood losses. While it is easy to determine the amounts of blood taken away with absorption devices, the amount of blood loss owing to the use of plugs, cotton swabs or wads during an operation has not been possible for the lack of an appropriate device. The arrangement according to the invention permits a precise determination of such blood losses in the following manner: physiological sodium chloride solution (normal saline solution) of exactly predetermined amount is charged into a household washing machine. If all the plugs, cotton swabs, etc. used during the operation are placed in the washing machine, then a photometrically determinable proportion is produced between the amount of blood diluted in the normal saline solution mixed with blood and between the originally charged normal saline solution. Dipping in the measuring rod of the measuring arrangement according to FIG. 3, the hemoglobin content of the blood diluted in the machine can be determined. Since the amount of normal saline solution charged into the machine is known, the increase of the hemoglobin value will be proportional to the amount of blood introduced, so that the signalling instrument of the apparatus can be calibrated directly for the amount of blood losses in mls. In this manner the apparatus will provide instantaneous determination of blood losses during operation, so that replacement can be supplied precisely and without delay.

What we claim is:

1. Apparatus for determining the hemoglobin content and hematocrit ratio of blood samples, comprising a pair of glass prisms having flat parallel confronting surfaces spaced a predetermined distance apart, means for directing a beam of light through one prism toward the other prism perpendicular to said surfaces and back out of said other prism, means for receiving and determining the intensity of the returned beam of light, at least one electrode on each of said confronting surfaces of said prisms, means for passing an electric current between said electrodes through a blood sample which is between said surfaces, and means for measuring the resistance of said sample to the passage of said current of electricity.

2. Apparatus as claimed in claim 1, and means for deriving a function of said intensity and said resistance.

3. Apparatus as claimed in claim 1, said prisms being elongated and parallel to each other in a direction parallel to said surfaces.

4. Apparatus as claimed in claim 3, and a container for said blood sample, said prisms extending out of said container.

5. Apparatus as claimed in claim 1, said confronting surfaces of said prisms being spaced so close together that a blood sample will remain between and in contact with both said confronting surfaces by capillary action.

* * * * *